United States Patent
Ahn et al.

(10) Patent No.: US 11,535,001 B2
(45) Date of Patent: Dec. 27, 2022

(54) MANUFACTURING METHOD OF ANODIC OXIDE FILM STRUCTURE AND ANODIC OXIDE FILM STRUCTURE

(71) Applicant: POINT ENGINEERING CO., LTD., Asan (KR)

(72) Inventors: Bum Mo Ahn, Suwon (KR); Seung Ho Park, Hwaseong (KR); Sung Hyun Byun, Hwaseong (KR)

(73) Assignee: POINT ENGINEERING CO., LTD., Asan (KR)

( * ) Notice: Subject to any disclaimer, the term of this patent is extended or adjusted under 35 U.S.C. 154(b) by 0 days.

(21) Appl. No.: 17/128,758

(22) Filed: Dec. 21, 2020

(65) Prior Publication Data
US 2021/0221091 A1  Jul. 22, 2021

(30) Foreign Application Priority Data
Jan. 20, 2020 (KR) ........................ 10-2020-0007568

(51) Int. Cl.
| | | |
|---|---|---|
| *B32B 43/00* | (2006.01) |
| *B23P 6/00* | (2006.01) |
| *B32B 3/26* | (2006.01) |
| *B32B 7/12* | (2006.01) |
| *B32B 15/20* | (2006.01) |
| *C25D 11/04* | (2006.01) |
| *B32B 37/12* | (2006.01) |
| *B32B 15/04* | (2006.01) |

(52) U.S. Cl.
CPC ............... *B32B 3/266* (2013.01); *B23P 6/00* (2013.01); *B32B 7/12* (2013.01); *B32B 15/043* (2013.01); *B32B 15/20* (2013.01); *B32B 37/12* (2013.01); *B32B 43/00* (2013.01); *C25D 11/04* (2013.01)

(58) Field of Classification Search
CPC ... B23P 6/00; B23P 6/04; B32B 43/00; B32B 43/003; B25D 5/67
See application file for complete search history.

(56) References Cited

U.S. PATENT DOCUMENTS

2016/0230558 A1* 8/2016 McCall ................. F01D 5/20
2017/0292202 A1* 10/2017 Curran ................. C25D 11/18

FOREIGN PATENT DOCUMENTS

KR  100664900 B1  1/2007
TW  201321740 A1  6/2013

* cited by examiner

*Primary Examiner* — Christopher J Besler (57) ABSTRACT

Proposed are a manufacturing method of an anodic oxide film structure, and an anodic oxide film structure. More particularly, proposed are a manufacturing method of an anodic oxide film structure, and an anodic oxide film structure, wherein production yield of the entire product can be improved by repairing a defective region to be made normal.

2 Claims, 9 Drawing Sheets

MANUFACTURING METHOD OF ANODIC OXIDE FILM STRUCTURE AND ANODIC OXIDE FILM STRUCTURE

CROSS REFERENCE TO RELATED APPLICATION

The present application claims priority to Korean Patent Application No. 10-2020-0007568, filed Jan. 20, 2020, the entire contents of which is incorporated herein for all purposes by this reference.

BACKGROUND OF THE INVENTION

Field of the Invention

The present disclosure relates to a manufacturing method of an anodic oxide film structure and to an anodic oxide film structure.

Description of the Related Art

A mother plate made of an anodic oxide film having less thermal deformation under a high-temperature atmosphere can be manufactured in various structures and used as a component in the semiconductor or display field.

The mother plate made of the anodic oxide film may be manufactured by a process of manufacturing a mother plate. The mother plate made of the anodic oxide film may be manufactured by the following process.

First, a process of providing and anodizing an aluminum base material may be performed. By this process, an anodic oxide film composed of anodized aluminum ($Al_2O_3$) is formed on the surface of the base material. The anodic oxide film is divided into a barrier layer in which no pores are formed and a porous layer in which pores are formed. The barrier layer is positioned on the base material, and the porous layer is positioned on the barrier layer. In the state in which the anodic oxide film having the barrier layer and the porous layer is formed on the base material, a process of removing the base material may be performed. By this process, only the anodic oxide film composed of anodized aluminum ($Al_2O_3$) remains.

The mother plate made of the anodic oxide film may be manufactured by performing many processes including the above-described process.

The mother plate made of the anodic oxide film may have holes formed by an etching process as an example in order to be used as a component in a specific field. However, in the process of forming the holes, if the holes are not formed according to a design pattern (e.g., hole formation position, hole size, hole shape, etc.), a hole defect problem may occur. Hole defects occurring in the mother plate may be treated as a defect of the mother plate itself.

As such, when a defect in a small portion (e.g., a hole defect) is treated as a defect of the mother plate itself, a problem wherein production yield of the mother plate made of the anodic oxide film is significantly reduced may occur.

Therefore, there is a need to develop a technology capable of repairing a small defective portion of a mother plate made of an anodic oxide film and solving the problem of reducing production yield of the mother plate.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent document 1) Korean Patent No. 10-0664900

SUMMARY OF THE INVENTION

Accordingly, the present disclosure has been made keeping in mind the above problems occurring in the related art, and an objective of the present disclosure is to provide a manufacturing method of an anodic oxide film structure, the method capable of improving production yield by making a defective region normal, and to provide an anodic oxide film structure.

In order to achieve the above objective, according to one aspect of the present disclosure, there is provided a manufacturing method of an anodic oxide film structure, the manufacturing method including: testing whether a defective region of an anodic oxide film plate exists; and repairing the defective region existing in the anodic oxide film plate to be made normal.

Furthermore, the manufacturing method may further include: performing bonding with a bonding layer provided on at least one surface of the anodic oxide film plate.

Furthermore, the anodic oxide film plate may be composed of a plurality of divided plates, and the repairing of the defective region may be performed by replacing a divided plate including the defective region with a normal divided plate to make the defective region normal.

Furthermore, the repairing of the defective region may be performed by cutting out a partial region including the defective region and replacing the cut-out region with a normal region to make the defective region normal.

Furthermore, the repairing of the defective region may be performed by charging a filling material in a defective through-hole included in the defective region to make the defective region normal.

According to another aspect of the present disclosure, there is provided an anodic oxide film structure, including: an anodic oxide film plate composed of a plurality of divided plates; and a bonding layer provided on at least one surface of the anodic oxide film plate to integrate the divided plates.

Furthermore, the anodic oxide film plate may include a plurality of anodic oxide film plates stacked from top to bottom, and boundaries between the divided plates of adjacent ones of the anodic oxide film plates stacked from top to bottom may not correspond to each other.

According to still another aspect of the present disclosure, there is provided an anodic oxide film structure, including: an anodic oxide film plate having a normal through-hole and a repair hole; and a repair portion provided around the repair hole.

According to the present disclosure, it is possible to prevent a problem wherein the anodic oxide film plate in which a small defect has occurred is treated as defective and discarded. As a result, it is possible to efficiently manufacture an anodic oxide film structure of good quality, thereby improving production yield of the anodic oxide film structure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Contents of the description below merely exemplify the principle of the present disclosure. Therefore, those of ordinary skill in the art may implement the theory of the present disclosure and invent various apparatuses which are included within the concept and the scope of the present disclosure even though it is not clearly explained or illustrated in the description. Furthermore, in principle, all the conditional terms and embodiments listed in this description are intended for the purpose of understanding the concept of the present disclosure clearly, and one should understand that this invention is not limited the exemplary embodiments and the conditions.

The above described objectives, features, and advantages will be more apparent through the following detailed description related to the accompanying drawings, and thus those of ordinary skill in the art may easily implement the technical spirit of the present disclosure.

The embodiments of the present disclosure will be described with reference to cross-sectional views and/or perspective views which schematically illustrate ideal embodiments of the present disclosure. For explicit and convenient description of the technical content, sizes or thicknesses of films and regions and diameters of holes in the figures may be exaggerated. Therefore, variations from the shapes of the illustrations as a result, for example, of manufacturing techniques and/or tolerances, are to be expected. Thus, the embodiments should not be construed as limited to the particular shapes of regions illustrated herein but are to include deviations in shapes that result, for example, from manufacturing.

Wherever possible, the same reference numerals will be used throughout different embodiments and the description to refer to the same or like elements or parts. In addition, the configuration and operation already described in other embodiments will be omitted for convenience.

Hereinafter, exemplary embodiments of the present disclosure will be described in detail with reference to the accompanying drawings.

A manufacturing method of an anodic oxide film structure according to the present disclosure may include the steps of: testing whether a defective region PF of an anodic oxide film plate AP exists; and repairing the defective region PF existing in the anodic oxide film plate AP to be made normal.

The defective region PF of the anodic oxide film plate AP may be a fine crack or a depression generated in the process of manufacturing the anodic oxide film plate AP. In addition, the defective region PF may be defined by including a defective through-hole 110 formed differently from a design pattern. Hereinafter, as an example, the defective region PF will be described as being the defective through-hole 110 formed differently from the design pattern.

The present disclosure may perform a step of providing the anodic oxide film plate AP before performing the step of testing whether the defective region PF exists.

In the present disclosure, each divided plate DP having a relatively small size may be manufactured to define a mother plate size of the anodic oxide film plate AP. Then, a plurality of divided plates DP may be arranged to constitute the anodic oxide film plate AP having the mother plate size. In this case, the divided plates DP may be provided on a bonding layer 60 having a size corresponding to the anodic oxide film plate AP having the mother plate size.

Then, since the defective region PF is described as being the defective through-hole 110 as an example in the present disclosure, a process of forming a through-hole 100 in the anodic oxide film plate AP may be performed.

In this case, the through-hole 100 may be formed according to embodiments of the step of providing the anodic oxide film plate AP.

Specifically, in the present disclosure, when each of the small-size divided plates DP is manufactured and provided, the through-hole 100 may be formed in each of the divided plates DP.

On the other hand, in the present disclosure, when the anodic oxide film plate AP is provided as an undivided mother plate, the through-hole 100 may be formed in the anodic oxide film plate AP.

Preferably, the process of forming the through-hole 100 may be performed after a photosensitive material capable of being subjected to a photolithography process is provided on at least one surface of the anodic oxide film plate AP. The photosensitive material may function as a mask for forming the through-hole 100 in the anodic oxide film plate AP.

At least a portion of the photosensitive material may be patterned by the photolithography process. The anodic oxide film plate AP may be subjected to an etching process in a region removed by patterning. This may result in the formation of the through-hole 100. Then, the photosensitive material may be removed.

Meanwhile, when the anodic oxide film plate AP is provided in a structure that is divided by a dividing step to be described later, the through-hole 100 may be formed by a bonding step performed before the dividing step. A detailed description of this will be described later in the description of performing the bonding step before the dividing step.

Then, the step (hereinafter, referred to as a 'testing step') of testing whether the defective region PF of the anodic oxide film plate AP exists may be performed. The testing step may be performed by a testing means suitable for testing and determining the defective region PF of the anodic oxide film plate AP.

In the present disclosure, after the anodic oxide film plate AP is composed of the plurality of divided plates DP, the testing step may be performed at once.

On the other hand, in the present disclosure, after each of the divided plates DP is manufactured and the through-hole 100 is formed, the testing step may be performed individually.

In the present disclosure, through the testing step, whether the defective region PF of the anodic oxide film plate AP exists may be tested and whether the defective region PF exists may be determined.

In the present disclosure, after performing the inspection step, a step of repairing the defective region PF to be made normal (hereinafter, referred to as a 'repair step) may be performed.

The repair step may be performed in various embodiments. In this case, the anodic oxide film plate AP may be provided in a suitable structure according to the process of performing the repair step. Therefore, an additional step may be performed before the repair step is performed.

Figure 1:
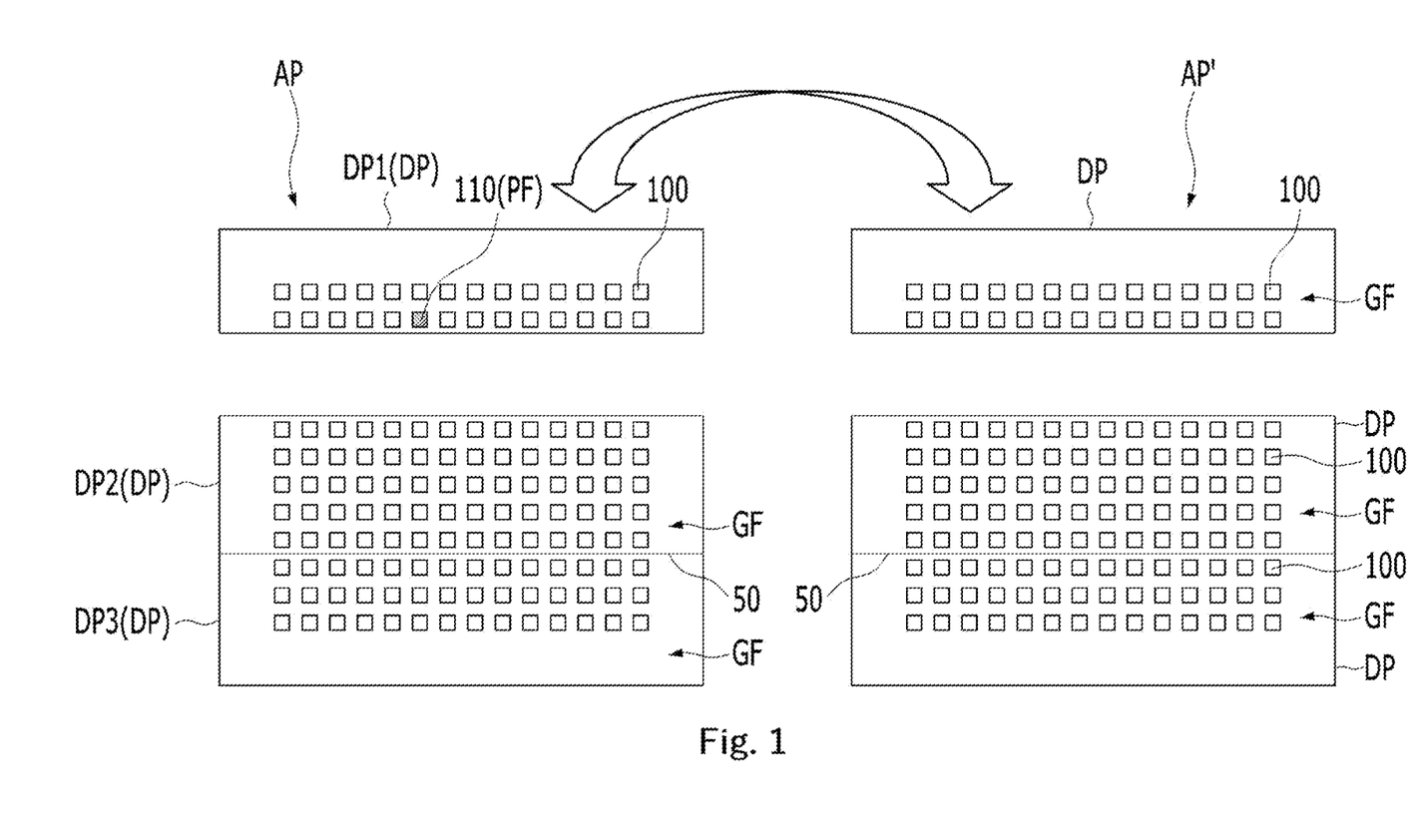
FIG. 1 is a view schematically illustrating a repair step according to a first embodiment of a manufacturing method of an anodic oxide film structure according to the present disclosure.

FIG. 1 is a view schematically illustrating a repair step according to a first embodiment of the present disclosure. As illustrated in FIG. 1, in the repair step according to the first embodiment, a process in which a divided plate DP including a defective region PF of an anodic oxide film plate AP divided into a plurality of pieces is replaced with a normal divided plate DP may be performed.

In the repair step according to the first embodiment, the anodic oxide film plate AP may be composed of a plurality of divided plates DP. In the repair step according to the first embodiment, the divided plate DP including the defective region PF may be replaced with the normal divided plate DP, so that the defective region PF may be made normal.

In the present disclosure, in the step of providing the anodic oxide film plate AP, a mother anodic oxide film plate AP may be provided. In this case, the present disclosure may perform a step of dividing the mother anodic oxide film plate AP into a plurality of pieces (hereinafter, referred to as a 'dividing step') before performing the repair step according to the first embodiment.

By the dividing step, the divided plates DP may be provided simultaneously to define the mother plate size of the anodic oxide film plate AP. Preferably, the dividing step may be performed after the testing step.

In the present disclosure, a divided structure that utilizes an original normal region GF not including the defective region PF may be designed in advance through the inspection step, and then the dividing step may be performed. The original normal region GF may be a region composed of a normal through-hole 100. As a result, a boundary 50 between the divided plates DP may be provided on the anodic oxide film plate AP as less as possible.

Then, the dividing step may be performed to perform the repair step according to the first embodiment. At least one of the divided plates DP resulting from the dividing step may include a defective region PF.

In the present disclosure, the dividing step may be selectively performed according to embodiments including the anodic oxide film plate AP in the step of providing the anodic oxide film plate AP.

Specifically, in the present disclosure, when each of the divided plates DP is manufactured individually to provide the anodic oxide film plate AP, the dividing step may be omitted.

On the other hand, in the present disclosure, when the undivided mother anodic oxide film plate AP is provided in the step of providing the anodic oxide film plate AP, the dividing step may be performed. In this case, preferably, in the dividing step, the anodic oxide film plate AP is divided so that the original normal region GF of the anodic oxide film plate AP is utilized as much as possible.

As an example, as illustrated in FIG. 1, when the anodic oxide film plate AP is divided into a horizontal strip shape, the divided plate DP including the defective region PF may have a smaller area than other divided plates DP including no defective regions PF. Thus, the original normal region GF of the anodic oxide film plate AP may be utilized as much as possible, and only the defective region PF may be efficiently replaced.

In the present disclosure, although the defective region PF has been described as occurring only in one region as an example, the defective region PF may occur in several regions in one anodic oxide film plate AP. Also in this case, in present disclosure, only the defective region PF may be divided with a minimum area through the dividing step.

By the dividing step, the anodic oxide film plate AP may be divided into, as an example, a horizontal strip shape, a vertical strip shape, a polygonal shape, and a shape in which only at least a partial region is divided. The divided shape of the anodic oxide film plate AP is not limited thereto.

Then, a step of performing bonding with a bonding layer 60 provided on at least one surface of (hereinafter, referred to as a 'bonding step') may be additionally performed. The divided pieces of the anodic oxide film plate AP may be integrated together by the bonding layer 60.

Meanwhile, the bonding step may be performed before the dividing step. In this case, preferably, the anodic oxide film plate AP is provided in a state in which no through-holes 100 are formed. The anodic oxide film plate AP may have the bonding layer 60 on at least one surface thereof. Then, at least a portion of the bonding layer 60 may be patterned by a lithography process. The anodic oxide film plate AP may be subjected to an etching process in a region removed by patterning. This may result in the formation of the through-hole 100.

On the other hand, in the present disclosure, when each of the divided plates DP is provided individually to provide the anodic oxide film plate AP, the bonding layer 60 having a size corresponding to the anodic oxide film plate AP having the mother plate size may be provided in the step of providing the anodic oxide film plate AP. In this case, the present disclosure may perform a bonding step of integrating the divided plates DP in the step of providing the anodic oxide film plate AP.

When performing the bonding step in the step of providing the anodic oxide film plate AP, the bonding step may be performed after forming the through-hole 100 in each of the divided plates DP.

On the other hand, in the present disclosure, the bonding step may be performed before forming the through-hole 100 in the divided plate DP. In this case, the bonding layer 60 may be used as a photosensitive material for forming the through-hole 100 in the process of forming the through-hole 100 described above. Therefore, the bonding layer 60 may perform a function of providing a region for forming the through-hole 100.

The bonding layer 60 may have photosensitive properties for the purpose of undergoing patterning by a photolithography process and have bonding properties for the purpose of performing a bonding function.

When the bonding step is performed before the dividing step, the bonding layer 60 may perform a function of providing a region for forming the through-hole 100. In addition, the bonding layer 60 may perform a function of integrating the pieces of the anodic oxide film plate AP divided by the dividing step performed after the bonding step. Therefore, when the bonding step is performed before the dividing step, the bonding layer 60 may simultaneously perform a function of providing a region for forming the through-hole 100 and a function of integrating the divided plates DP.

In the present disclosure, when the dividing step is performed after the bonding step, the anodic oxide film plate AP may be divided by using a means capable of dividing only the anodic oxide film plate AP except for the bonding layer 60.

Then, the repair step according to the first embodiment as illustrated in FIG. 1 may be performed. In FIG. 1, as an example, the anodic oxide film plate AP is illustrated and described as being divided into a horizontal strip shape. In this case, the divided number of the anodic oxide film plates AP is not limited.

In FIG. 1, as an example, the anodic oxide film plate AP may be composed of first, second and third divided plates DP1, DP2, and DP3, and the first divided plate DP3 may include a defective region PF. Therefore, the first divided plate DP1, the second divided plate DP2, and the third divided plate DP3 may be sequentially positioned from the top in the drawing of FIG. 1.

In the repair step according to the first embodiment, a process of separating the divided plate DP including the defective region PF from the bonding layer 60 may be performed. Therefore, the first divided plate DP1 may be separated from the bonding layer 60. In this process, a suitable transfer means for separating and transferring the divided plate DP from the bonding layer 60 may be used.

In the repair step according to the first embodiment, a temporary anodic oxide film plate AP' including a normal divided plate DP replacing the first divided plate DP1 including the defective region PF may be provided. The temporary anodic oxide film plate AP' may be divided and provided in the same structure as the anodic oxide film plate AP including the first, second, third divided plates DP1, DP2, and DP3.

The transfer means may separate the normal divided plate DP from a bonding layer 60 of the temporary anodic oxide film plate AP'. Then, the normal divided plate DP may be transferred to a position where the first divided plate DP1 is removed. Then, the bonding step may be performed. The normal divided plate DP may be integrated with remaining divided plates (e.g., the second and third divided plates DP2 and DP3) of the anodic oxide film plate AP by the bonding layer 60 of the anodic oxide film plate AP.

As such, in the present disclosure, the anodic oxide film plate AP may be divided so that only a specific portion (specifically, a portion including the defective region PF) may be removed and replaced easily, and the repair step according to the first embodiment may be performed.

By the repair step according to the first embodiment, original normal regions (e.g., the second and third divided plates DP2 and DP3) of the anodic oxide film plate AP may remain used, and only a partial defective region (e.g., the first divided plate DP1) may be replaced. As a result, a problem wherein the anodic oxide film plate AP is treated as defective due to occurrence of a small defective portion and is discarded may be prevented. Thus, production yield of the entire anodic oxide film structure including the anodic oxide film plate AP may be improved.

FIGS. 2A, 2B, 2C, 3A, 3B, 3C, and 3D are views illustrating various embodiments of an anodic oxide film plate AP constituting an anodic oxide film structure 1 according to the present disclosure.

The anodic oxide film plate AP may be divided into various shapes and composed of a plurality of divided plates DP. The number of the divided plates DP illustrated in FIGS. 2A, 2B, 2C, 3A, 3B, 3C, and 3D is illustrated as an example, and thus the number of the divided plates DP is not limited.

A bonding layer 60 for integrating the divided plates DP may be provided on at least one surface of the anodic oxide film plate AP. In this case, the anodic oxide film plate AP may be in a state in which a defective region PF is repaired and the entire region is made normal by the repair step according to the first embodiment.

In the present disclosure, in order to perform the repair step according to the first embodiment, the step of dividing the anodic oxide film plate AP may be performed. The anodic oxide film plate AP having undergone the dividing step may have different boundaries 50 depending on the structure divided in the dividing step.

Therefore, as illustrated in FIGS. 2A, 2B, 2C, 3A, 3B, 3C, and 3D, the anodic oxide film plate AP having undergone the repair step according to the first embodiment may have a boundary 50 between the divided plates DP constituting the anodic oxide film plate AP.

FIGS. 2A, 2B, 2C, 3A, 3B, 3C, and 3D illustrate various embodiments of the divided structure of the anodic oxide film plate AP.

Figure 2A:
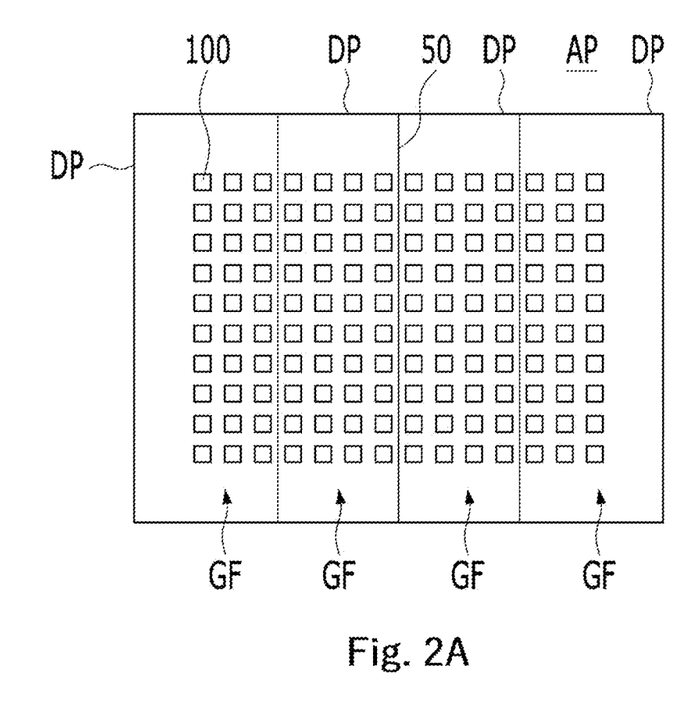
FIGS. 2A, 2B, 2C, 3A, 3B, 3C, and 3D are views illustrating various embodiments of an anodic oxide film plate constituting an anodic oxide film structure according to the present disclosure.

As illustrated in FIG. 2A, the anodic oxide film plate AP may be composed of divided plates DP having a vertical strip shape. The anodic oxide film plate AP may be composed of a plurality of vertical strip-shaped regions by the boundary 50 that divides the divided plates DP. In this case, at least one divided plate DP may be a normal divided plate DP replaced by the repair step according to the first embodiment.

Figure 2B:
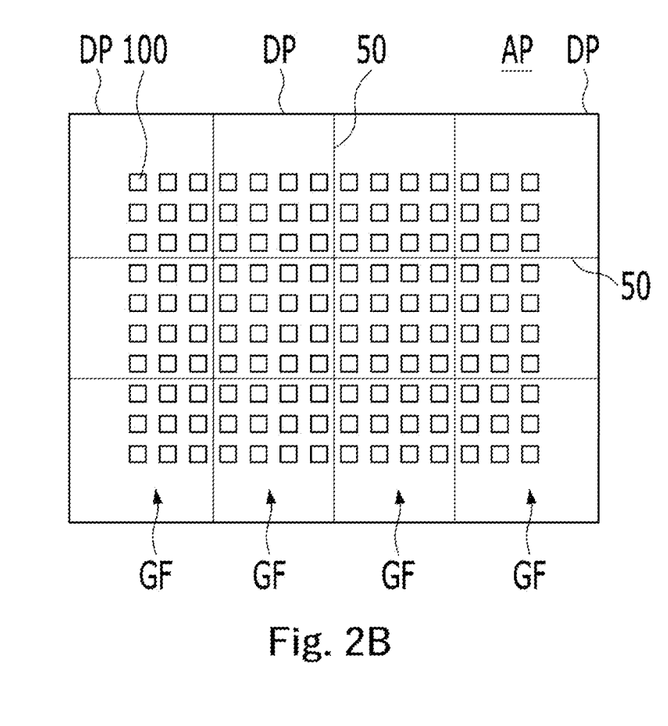

As illustrated in FIG. 2B, the anodic oxide film plate AP may be composed of divided plates DP having a polygonal shape. In the present disclosure, as an example, the anodic oxide film plate AP may be composed of a plurality of divided plates DP having a quadrangular shape.

The quadrangular-shaped divided plates DP may be formed by forming horizontal strip-shaped divided plates DP on the anodic oxide film plate AP and forming vertical strip-shaped divided plates DP. Thus, the anodic oxide film plate AP may have a structure in which a horizontal boundary 50 and a vertical boundary 50 cross each other.

As illustrated in FIG. 2B, when the divided plates DP have a quadrangular cross-section, the divided plates DP may be arranged in a checkerboard arrangement on the anodic oxide film plate AP. In this case, at least one divided plate DP may be a normal divided plate DP replaced by the repair step according to the first embodiment.

Figure 2C:
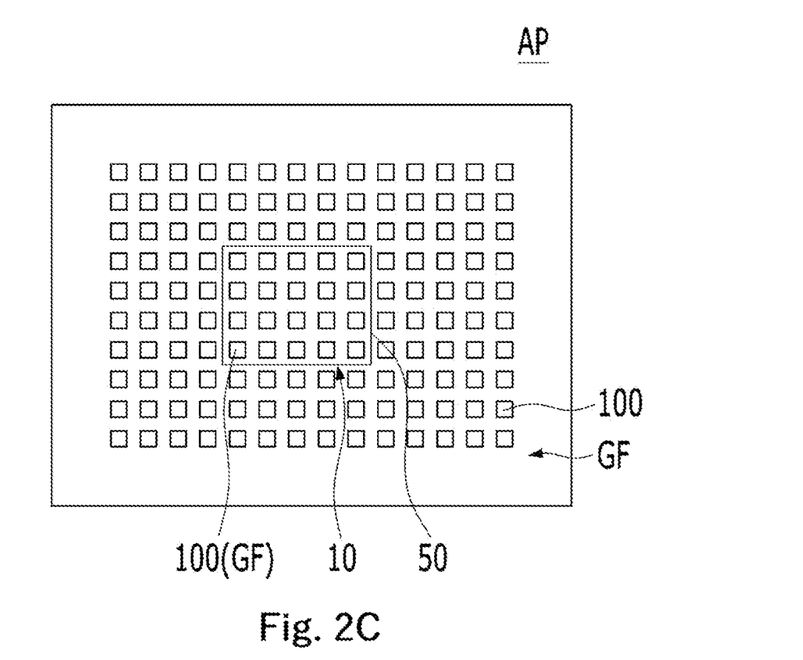

As illustrated in FIG. 2C, the anodic oxide film plate AP may be configured in a shape in which only a partial region 10 is divided by a boundary 50. In FIG. 2C, as an example, a partial region 10 of a quadrangular cross-section having an area smaller than the total area of the anodic oxide film plate AP may be provided. The partial region 10 may be provided to have a polygonal cross-section. In this case, at least one of two regions divided by the boundary 50 may be a region that has been made normal by the repair step according to the first embodiment.

FIGS. 3A, 3B, 3C, and 3D illustrate embodiments in which an anodic oxide film plate AP is divided into a through-hole existing region 130 in which a through-hole 100 exists and an edge region 120 where no through-holes 100 exist. In this case, at least one of the through-hole existing region 130 and the edge region 120 may be a region that has been made normal by the repair step according to the first embodiment.

As illustrated in FIGS. 3A, 3B, 3C, and 3D, the anodic oxide film plate AP may be composed of the through-hole existing region 130 and the edge region 120.

The edge region 120 is a region where no through-holes 100 exist, and does not undergo a separate additional process (e.g., an etching process for forming the through-hole 100), and thus a defect rate may be low.

Therefore, in the present disclosure, by separating the edge region 120 having a high probability of consisting only of a normal region from the through-hole existing region 130, utilization of the normal region may be increased.

The through-hole existing region 130 is a region in which a separate etching process for forming the through-hole 100 is performed, and may be a region having a relatively high probability of occurrence of a defective region PF. In the present disclosure, the through-hole existing region 130 may be composed of a plurality of divided plates DP.

The through-hole existing region 130 may be composed of divided plates DP of various shapes.

Figure 3A:
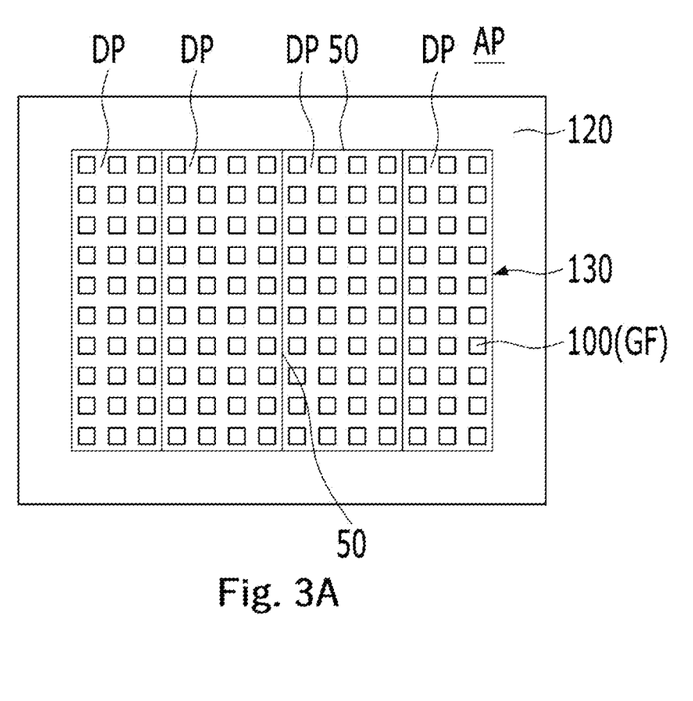

As illustrated in FIG. 3A, the through-hole existing region 130 may be divided into a vertical strip shape. Thus, the through-hole existing region 130 may have a vertical boundary 5.

The through-hole existing region 130 may have a relatively high probability of generating a defective region PF. Therefore, in the present disclosure, as illustrated in FIGS. 3A, 3B, 3C, and 3D, with a structure in which the through-hole existing region 130 is divided into a plurality of portions, a region having a high probability of occurrence of a defective portion may be efficiently repaired.

Figure 3B:
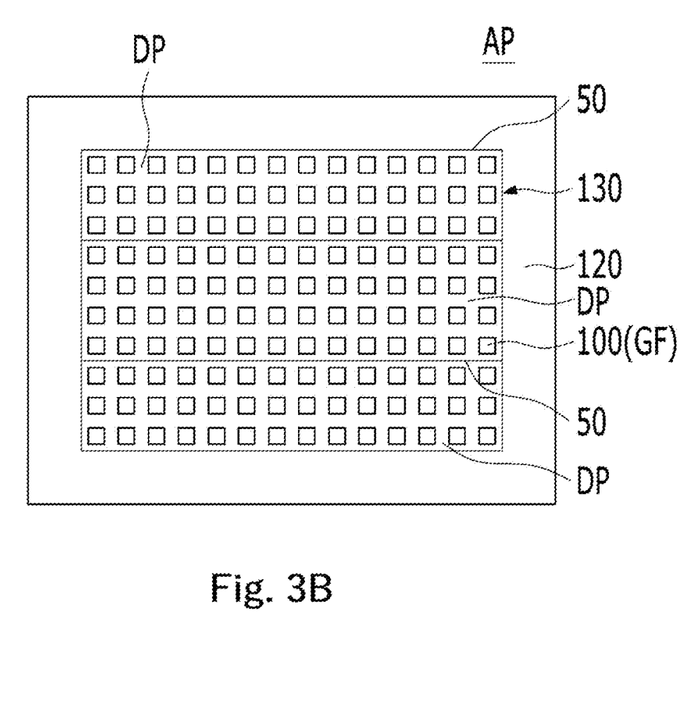

On the other hand, as illustrated in FIG. 3B, the through-hole existing region 130 may be divided into a horizontal strip shape. In this case, the anodic oxide film plate AP has a boundary 50 that divides the edge region 120 and the through-hole existing region 130, and a horizontal boundary 50 that divides the through-hole existing region 130 into a plurality of portions.

Figure 3C:
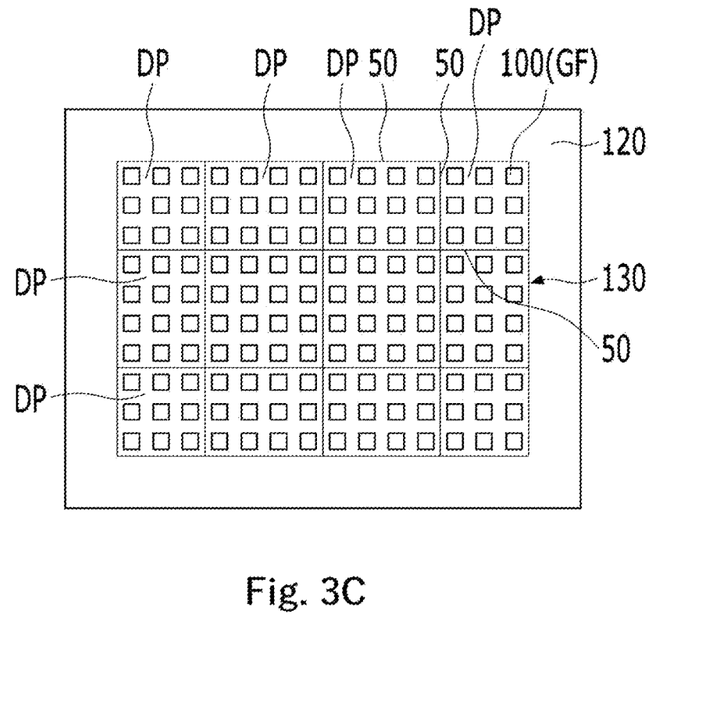

On the other hand, as illustrated in FIG. 3C, the through-hole existing region 130 may be divided into a polygonal shape. As an example, the through-hole existing region 130 may be divided into a shape having a quadrangular cross-section. Thus, a plurality of divided plates DP having a quadrangular cross-section may be provided in the through-hole existing region 130.

With such a structure, the anodic oxide film plate AP may have a horizontal boundary 50 and a vertical boundary 50 that divide the through-hole existing region 130 into a checkerboard arrangement.

Figure 3D:
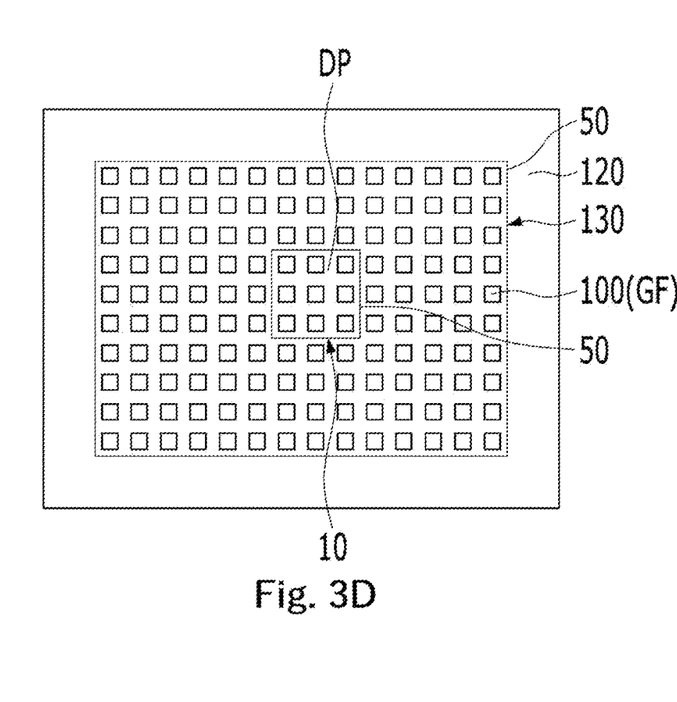

On the other hand, as illustrated in FIG. 3D, the through-hole existing region 130 may be divided into a shape in which only a partial region 10 is divided. As an example, in FIG. 3D, the partial region 10 may be a region of a quadrangular cross-section having an area smaller than that of the through-hole existing region 130.

With such a structure, the anodic oxide film plate AP may have a boundary 50 that divides the edge region 120 and the through-hole existing region 120. In addition, the anodic oxide film plate AP may have a boundary 50 that divides the partial region 10 having an area smaller than that of the through-hole existing region 130 and a remaining through-hole existing region 130 except for the partial region 10.

As illustrated in FIGS. 3A to 3D, the through-hole existing region 130 may be divided into various shapes by the boundary 50 existing in the through-hole existing region 130.

As described above, in the present disclosure, the through-hole existing region 130 having a relatively high probability of occurrence of defects may be divided into a plurality of portions to provide the divided plates DP. Thus, in the present disclosure, in the repair step according to the first embodiment, only the divided plate DP including the defective region PF may be easily replaced with the normal divided plate DP.

As described above, in the manufacturing method of the anodic oxide film structure according to the present disclosure, through the repair step according to the first embodiment, the divided plate DP having a small defective portion may be replaced with the normal divided plate DP. Thus, the anodic oxide film plate AP may be composed of only normal divided plates DP.

The anodic oxide film structure 1 manufactured through the above method may include the anodic oxide film plate AP composed of the plurality of divided plates DP, and the bonding layer 60 provided on at least one surface of the anodic oxide film plate AP to integrate the divided plates DP.

In the manufacturing method according to the present disclosure, only the defective region PF of the anodic oxide film plate AP may be partially repaired to make the anodic oxide film plate AP normal. Therefore, in the manufacturing method according to the present disclosure, a process of discarding the entire anodic oxide film plate AP in which a defect has occurred in a small portion and remanufacturing a new one may be omitted.

Since the anodic oxide film plate AP is manufactured through many processes, manufacturing time may be long. In the manufacturing method according to the present disclosure, the divided plates DP having a small size may be manufactured to constitute the anodic oxide film plate AP having the mother plate size. Alternatively, in the present disclosure, the anodic oxide film plate AP having the mother plate size may be manufactured and then divided to form the divided plates DP. Then, only a defective portion of the anodic oxide film plate AP may be partially repaired and made normal.

Therefore, a process of remanufacturing the anodic oxide film plate AP in which the defective portion exists may be omitted. Thus, an anodic oxide film structure 1 of good quality may be manufactured rapidly and efficiently, resulting in improving production yield.

Figure 4:
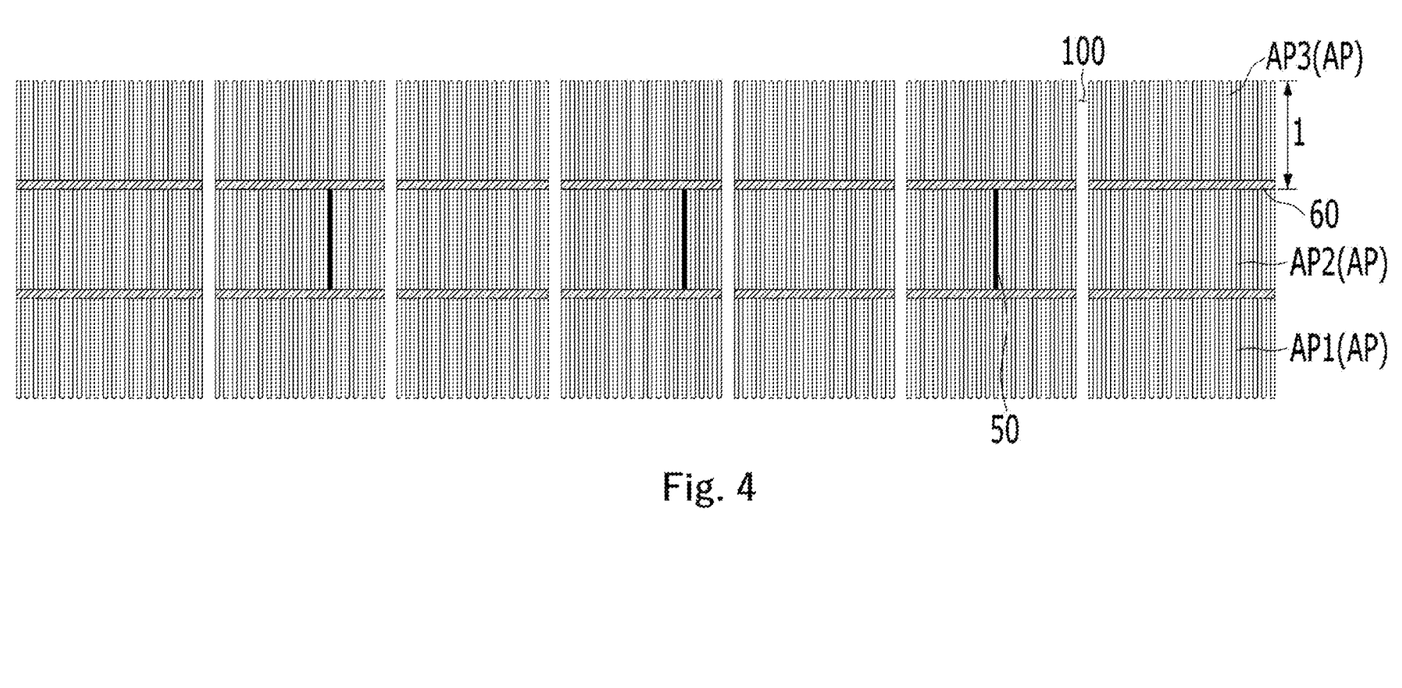
FIG. 4 is a view illustrating an embodiment of a laminated structure of an anodic oxide film structure according to the present disclosure.

FIG. 4 is a view illustrating an embodiment of a laminated structure of an anodic oxide film structure 1 according to the present disclosure. As illustrated in FIG. 4, a plurality of anodic oxide film structures 1 may be stacked in a laminated structure and may be used in the semiconductor or display field.

As an example, each of the anodic oxide film structure 1 may include an anodic oxide film plate AP composed of a plurality of divided plates DP. As illustrated in FIG. 4, the plurality of stacked anodic oxide film structures 1 may have a structure in which a plurality of anodic oxide film plates AP are stacked from top to bottom and bonded to each other by a bonding layer 60.

The anodic oxide film plates AP stacked from top to bottom may be configured so that boundaries 50 between divided plates DP forming the respective plates do not correspond to each other.

Specifically, the stacked plurality of anodic oxide film structures 1 may be composed of a first anodic oxide film plate AP1, a second anodic oxide film plate AP2, and a third anodic oxide film plate AP3 located sequentially from bottom to top in the drawing of FIG. 4.

As illustrated in FIG. 4, the second anodic oxide film plate AP2 may be composed of vertical strip-shaped divided plates DP as an example. Thus, a vertical boundary 50 may exist between the divided plates DP of the second anodic oxide film plate AP2.

In this structure, the third anodic oxide film plate AP3 and the first anodic oxide film plate AP1 stacked on the top and bottom of the second anodic oxide film plate AP2 may be configured to have a different divided structure from the second anodic oxide film plate AP2.

The third anodic oxide film plate AP3 may have a boundary 50 formed in a different direction from the vertical boundary 50 of the second anodic oxide film plate AP2. As an example, the third anodic oxide film plate AP3 may have a horizontal boundary 50 and may be provided on the top of the second anodic oxide film plate AP2. In other words, the third anodic oxide film plate AP3 may be composed of horizontal strip-shaped divided plates DP. Thus, the horizontal boundary 50 may exist between the divided plates DP of the third anodic oxide film plate AP3.

On the other hand, the third anodic oxide film plate AP3 may be configured to have a shape in which only a partial region 10 is divided. In this case, as an example, the partial region 10 may be a region having a quadrangular cross-section with an area smaller than the total area of the third anodic oxide film plate AP3.

Thus, a boundary 50 dividing the partial region 10 and a remaining region may exist in the third anodic oxide film plate AP3. When the partial region 10 as a quadrangular cross-section, a boundary 50 forming an outer periphery of the quadrangular cross-section may exist in at least a partial region of the third anodic oxide film plate AP3.

In the stacked anodic oxide film structures 1, the third anodic oxide film plate AP3 having the above structure may be provided on the top of the second anodic oxide film plate AP2. Thus, the stacked anodic oxide film structures 1 may have a structure in which the boundaries 50 between the divided plates DP of respective layers do not correspond to each other.

Meanwhile, the first anodic oxide film plate AP1 may have a boundary 50 formed in a different direction from the vertical boundary 50 of the second anodic oxide film plate AP2 and may be provided on the bottom of the second anodic oxide film plate AP2.

As an example, the first anodic oxide film plate AP1 may be composed of horizontal strip-shaped divided plates DP to have a horizontal boundary 50.

On the other hand, the first anodic oxide film plate AP1 may be configured to have a shape in which only a partial region 10 is divided. In this case, as an example, the partial region 10 may be a region having a quadrangular cross-section with an area smaller than the total area of the first anodic oxide film plate AP1.

In the stacked anodic oxide film structures 1, the first anodic oxide film plate AP1 having the above structure may be provided on the bottom of the second anodic oxide film plate AP2. Thus, the boundary 50 between the divides plates DP of the second anodic oxide film plate AP2 may not correspond to the boundary 50 between the divided plates DP of the first anodic oxide film plate AP1.

The anodic oxide film structures 1 stacked as described above may have a structure in which the boundaries 50 between the divided plates DP of the anodic oxide film plates AP1, AP2, and AP3 of respective layers do not correspond to each other. Specifically, adjacent anodic oxide film plates AP may have boundaries 50 that do not correspond to each other. Thus, the stacked anodic oxide film structures 1 may have a structure in which the boundaries 50 of the adjacent anodic oxide film plates AP at least partially cross each other or do not overlap each other. Such a structure may improve durability of the plurality of stacked anodic oxide film structures 1.

On the other hand, non-adjacent anodic oxide film plates AP may have boundaries 50 that correspond to each other. As an example with reference to FIG. 4, the first and third anodic oxide film plates AP1 and AP3 may have the second anodic oxide film plate AP2 interposed therebetween. Therefore, the first and third anodic oxide film plates AP1 and AP3 may be non-adjacent anodic oxide film plates AP. The first and third anodic oxide film plates AP1 and AP3 may have boundaries 50 corresponding to each other. In other words, the first and third anodic oxide film plates AP1 and AP3 may be composed of divided plates DP of the same type.

An anodic oxide film plate AP adjacent to each of the first and third anodic oxide film plates AP1 and AP3 may be the second anodic oxide film plate AP2. The stacked anodic oxide film structures 1 may have a structure in which boundaries 50 of anodic oxide film plates AP of adjacent layers do not correspond to each other. Therefore, the second anodic oxide film plate AP2 may have a boundary 50 that does not correspond to that of each of the first and third anodic oxide film plates AP1 and AP3. Thus, even when the first and third anodic oxide film plates AP1 and AP3 have the boundaries 50 corresponding to each other, a problem wherein strength of the anodic oxide film structure 1 is reduced due to the second anodic oxide film plate AP2 may be prevented.

Meanwhile, as illustrated in FIG. 4, in the stacked anodic oxide film structures 1, a bonding layer 60 for integrating divided plates DP may be provided between each of the anodic oxide film plates AP1, AP2, and AP3 of respective layers. With this structure, at least one surface of the boundary 50 provided in each layer may be bonded to the bonding layer 60. Thus, the bonding layer 60 may improve strength of the stacked anodic oxide film structures 1 by integrating the divided plates DP of each layer.

As described above, the anodic oxide film structures 1 according to the present disclosure may be configured so that the boundaries 50 of the anodic oxide film plates AP of adjacent layers do not correspond to each other in a structure in which a plurality of layers are stacked. As a result, the problem of reducing strength of the anodic oxide film structures 1 in the laminated structure may be prevented.

Figure 5:
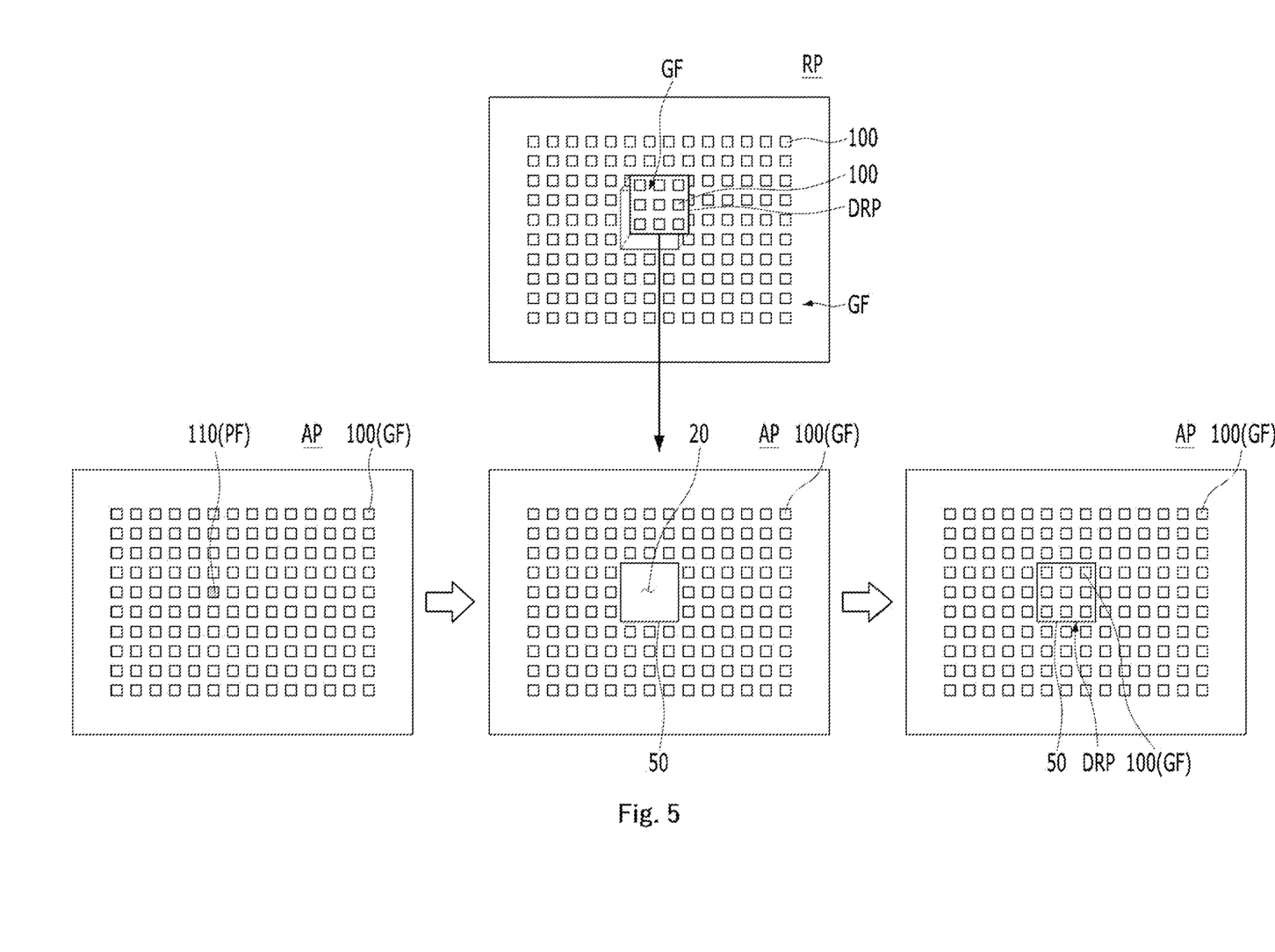
FIG. 5 is a view schematically illustrating a repair step according to a second embodiment of a manufacturing method of an anodic oxide film structure according to the present disclosure.
Figure 6:
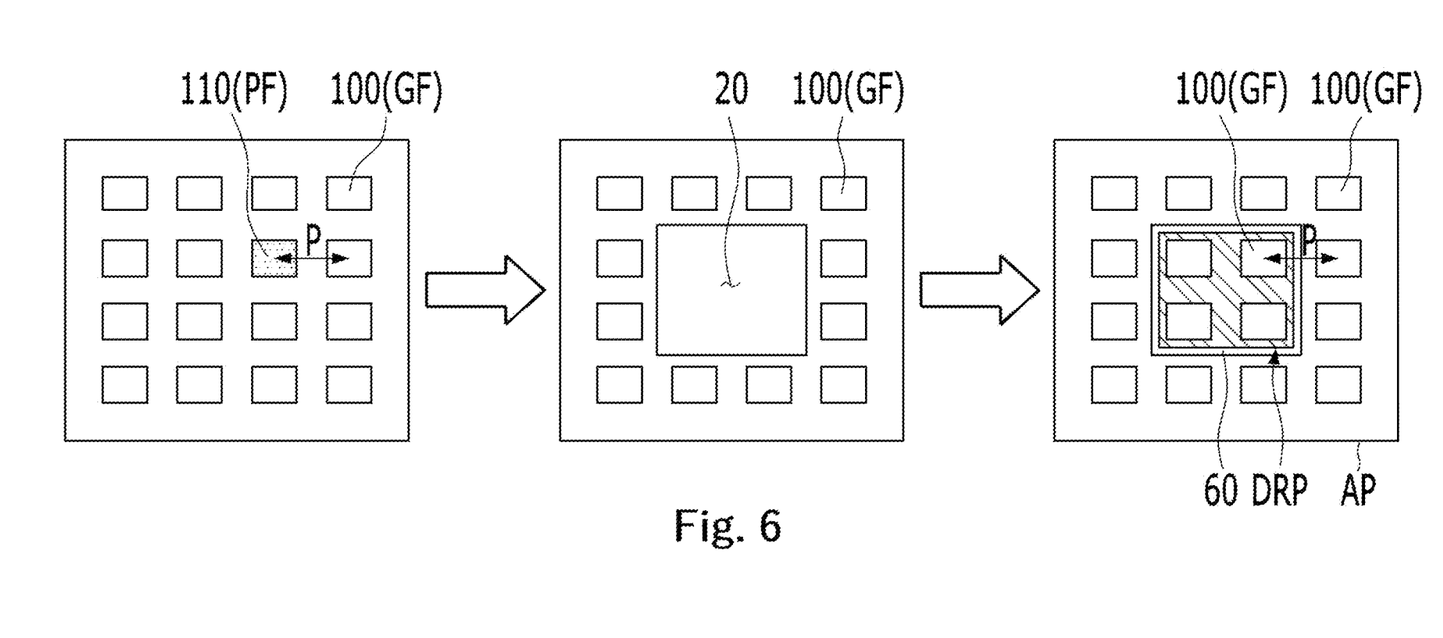
FIG. 6 is an enlarged view schematically illustrating the repair step according to the second embodiment of FIG. 5.

FIG. 5 is a view schematically illustrating a repair step according to a second embodiment of a method of manufacturing an anodic oxide film structure according to the present disclosure, and FIG. 6 is an enlarged view schematically illustrating a defective region PF in which the repair step according to the second embodiment is performed.

As illustrated in FIGS. 5 and 6, in the repair step according to the second embodiment, a process in which a partial region 10 including a defective region PF is cut out and the cut-out partial region 10 is replaced with a normal region GF may be performed. The partial region 10 may include the defective region PF, while including at least a partial region of a normal region GF adjacent to the defective region PF.

As illustrated in FIGS. 5 and 6, in an anodic oxide film plate AP, the defective region PF may be detected by a testing step.

Then, a process of cutting out the partial region 10 including the defective region PF may be performed. The region where the partial region 10 is cut out in the cutting-out process may be a cut-out region 20.

In the present disclosure, as an example, the cut-out region 20 is illustrated as having a quadrangular cross-section, but is not limited thereto, and the cut-out region 20 may have a cross-section other than the quadrangular cross-section.

As illustrated in FIG. 6, through-holes 100 may be provided in the anodic oxide film plate AP at a regular pitch distance P. The through-holes 100 may be formed with a fine inner diameter, and may have a narrow pitch distance. In this case, in the anodic oxide film plate AP, a defective through-hole 110 that is not formed according to a design pattern may be provided. The defective through-hole 110 may be a defective region PF. Meanwhile, a through-hole 100 formed according to the design pattern may be a normal region GF.

The defective region PF may be a portion having a small area. Therefore, in the anodic oxide film plate AP, preferably, the defective region PF and at least a portion of the normal region GF adjacent to the periphery of the defective region PF may be cut out simultaneously. Thus, the anodic oxide film plate AP may be prevented from experiencing other defects that may occur in the process of cutting out a small area.

As illustrated in FIG. 5, in the repair step according to the second embodiment, a divided repair plate DRP may be provided. The divided repair plate DRP may be a divided plate having an area smaller than or equal to the cut-out region 20. In the present disclosure, as an example, the area of the divided repair plate DRP will be described as being smaller than that of the cut-out region 20.

The divided repair plate DRP may have normal through-holes 100 in the same number as through-holes of the partial region 10 cut out from the anodic oxide film plate AP.

Specifically, the divided repair plate DRP may be cut from a mother repair plate RP so as to include the normal through-holes 100 in the number equal to the number of a defective through-hole 110 and a normal through-hole 100 included in the partial region 10 of the anodic oxide film plate AP. This may be to provide a structure in which the pitch distance P of the through-holes 100 of the anodic oxide film plate AP before having undergone the repair step according to the second embodiment is equal to that of through-holes 100 of an anodic oxide film plate 100 after having undergone the repair step.

As illustrated in FIG. 6, the divided repair plate DRP may be provided in the cut-out region 20 of the anodic oxide film plate AP. In this case, the divided repair plate DRP may be bonded to the cut-out region 20 by a bonding layer 60 provided on at least one surface of the anodic oxide film plate AP. In this case, the bonding layer 60 may integrate the anodic oxide film plate AP and the divided repair plate DRP provided in the cut-out region 20.

The divided repair plate DRP may have the through-holes 100 formed in a pitch distance P equal to the pitch distance P of the through-holes 100 of the anodic oxide film plate AP before having undergone the repair step.

Therefore, the anodic oxide film plate AP having undergone the repair step according to the second embodiment may have a structure in which the pitch distance of the through-holes 100 of the divided repair plate DRP is equal to that of adjacent through-holes 100 of the anodic oxide film plate AP, and that of through-holes 100 of a mother anodic oxide film plate AP.

In the anodic oxide film plate AP, the defective region PF may be made normal by the repair step according to the second embodiment. In this case, the anodic oxide film plate AP may have the divided repair plate DRP so that the pitch distance P between the through-holes 100 of the mother plate is maintained. Thus, even when having another plate (specifically, a divided repair plate) made of the same or different material by the repair step, the anodic oxide film plate AP may perform a function of using the through-holes 100 without error.

As described above, in the manufacturing method of the anodic oxide film structure according to the present disclosure, through the repair step according to the second embodiment, a portion in which the defective region PF exists may be cut out, and the cut-out portion may be replaced with a normal portion.

An anodic oxide film structure 1 manufactured by the above method may include an anodic oxide film plate AP having a cut-out region 20, a divided repair plate DRP provided in the cut-out region 20, and a bonding layer 60 provided on at least one surface of the anodic oxide film plate AP and the divided repair plate DRP to integrate the anodic oxide film plate AP and the divided repair plate DRP.

As illustrated in FIG. 6, when the area of the divided repair plate DRP is smaller than that of the cut-out region 20, the anodic oxide film structure 1 may have a structure in which a portion of the bonding layer 60 is exposed around the divided repair plate DRP.

In the anodic oxide film structure 1, the cut-out region 20 may be formed by cutting out a partial region 10 by dividing an original normal region GF and the partial region 10 including a defective region PF. The divided repair plate DRP may be provided in the cut-out region 20. Thus, the anodic oxide film structure 1 may have a structure in which a boundary 50 exists between the divided repair plate DRP and the original normal region GF.

The manufacturing method according to the present disclosure may partially repair only a defective portion of the anodic oxide film plate AP through the above repair step. Thus, the anodic oxide film structure 1 may be manufactured with only the anodic oxide film plate AP which has been made normal. As a result, production yield of the entire anodic oxide film structure 1 may be improved.

Figure 7:
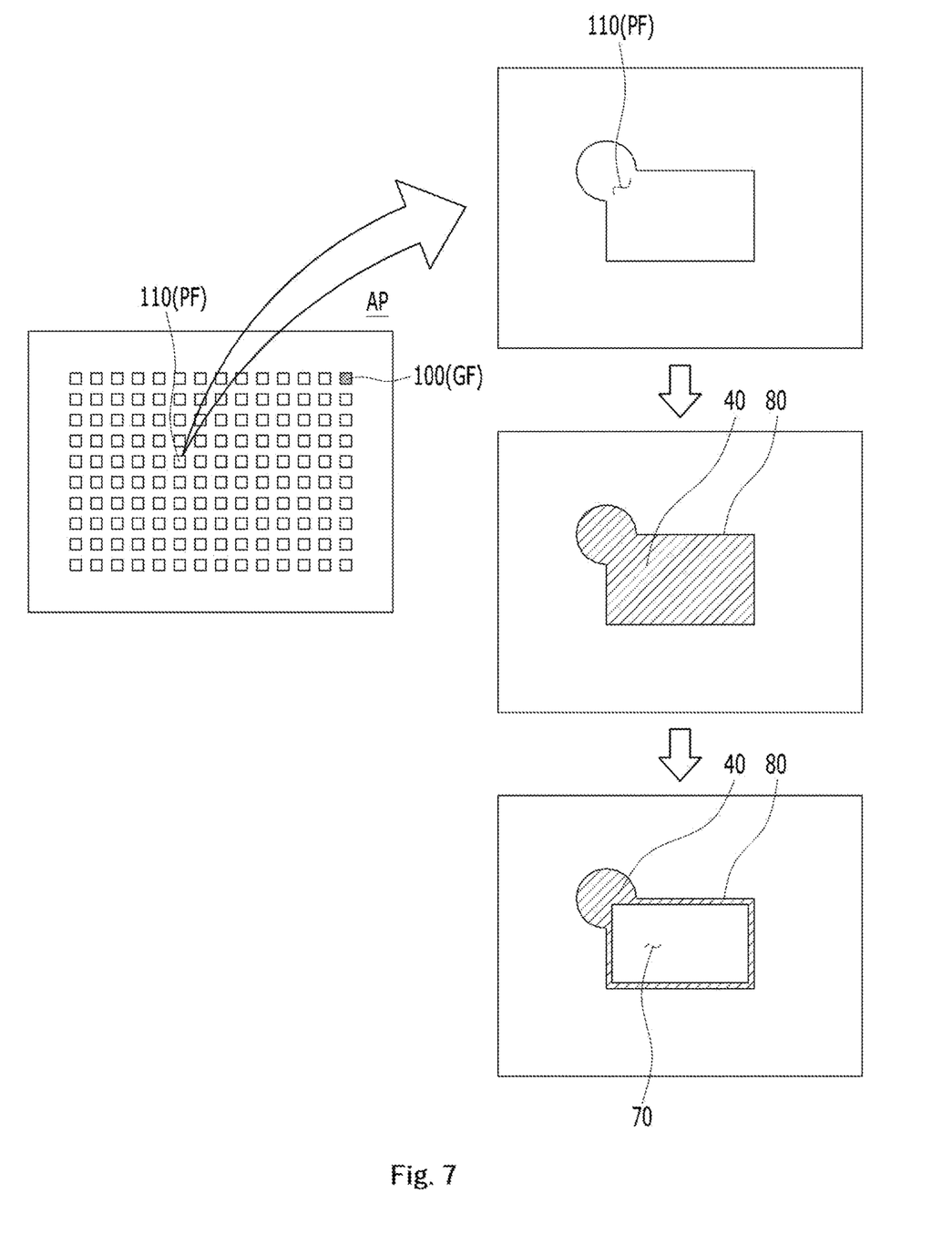
FIG. 7 is a view schematically illustrating a repair step according to a third embodiment of a manufacturing method of an anodic oxide film structure according to the present disclosure.

FIG. 7 is a view schematically illustrating a repair step according to a third embodiment of the present disclosure. In the repair step according to the third embodiment, a process in which a defective region PF is made normal by charging a filling material 40 into a defective through-hole 110 included in the defective region PF may be performed.

As illustrated in FIG. 7, the defective through-hole 110 different from a design pattern may be formed in an anodic oxide film plate AP and the defective region PF may be generated thereby. The defective region PF may include the defective through-hole 110.

First, a process of charging the filling material 40 in the defective through-hole 110 may be performed. Thus, the filling material 40 may be charged in the defective through-hole 110. The filling material 40 charged in the defective through-hole 110 may be a filling material having inorganic ceramic properties, or may be a filling material made of alumina ($Al_2O_3$) in powder form.

The anodic oxide film plate AP may have a repair portion 80 formed by charging the filling material 40 in the defective through-hole 110. The repair portion 80 may be a portion for processing a repair hole 70.

Then, the repair portion 80 may undergo a hole processing process for processing the repair hole 70. As the hole processing process, at least one of laser, drill, and etching processing may be used. The process of processing the repair hole 70 may be a process of making the defective through-hole 110 normal.

As illustrated in FIG. 7, the repair hole 70 may be formed within the range of the repair portion 80. Accordingly, after the repair hole 70 is formed in the repair portion 80, at least a portion of the repair portion 80 may remain. An anodic oxide film structure 1 may be formed in a structure in which at least a portion of the repair portion 80 is provided around the repair hole 70 by the remaining portion of the repair portion 80.

The anodic oxide film structure 1 manufactured by the manufacturing method of performing the repair step according to the third embodiment as described above may include the anodic oxide film plate AP having a normal through-hole 100 and the repair hole 70, and the repair portion 80 provided around the repair hole 70.

A plurality of such anodic oxide film structures 1 may be provided and stacked. In this case, a bonding layer 60 may be additionally provided on at least one surface of each of the respective anodic oxide film plates AP.

The stacked anodic oxide film structures 1 may have defective through-holes 110 at positions corresponding to each other. In this case, the performance of the stacked anodic oxide film structures 1 may be reduced due to the defective through-holes 110.

In the present disclosure, all defective through-holes 110 of each layer may be made normal through the repair step according to the third embodiment.

Meanwhile, in the present disclosure, defective through-holes 110 adjacent to the defective through-hole 110 at positions above and below the defective through-hole 110 may be made normal through the repair step according to the third embodiment.

When the defective through-holes 110 are made to be normal through-holes 100 above and below the defective through-hole 110, the stacked anodic oxide film structures 1 may perform their functions properly. Therefore, in the present disclosure, in the repair step according the third embodiment, when the defective through-holes 110 exist above and below the defective through-hole 110, any one of the defective through-holes 110 may be repaired and made normal.

In the present disclosure, in the repair step of the third embodiment, only a part of the defective through-holes 110 provided in the stacked anodic oxide film structures 1 may be made normal. Preferably, the defective through-holes 110 to be made normal are defective through-holes 110 provided in the anodic oxide film plates AP forming the surface of the stacked anodic oxide film structures 1. Therefore, the defective through-hole 110 that remains unrepaired may be located between the through-holes 100 that have been made normal.

As described above, in the present disclosure, through the manufacturing method including the repair step according to the third embodiment, the anodic oxide film structure 1 capable of providing a high quality function may be manufactured.

The anodic oxide film structure 1 according to the present disclosure may include an anodic oxide film plate AP having a repaired region. The repaired region may be a region that has been made normal by the repair step of the manufacturing method according to the present disclosure.

In the present disclosure, the anodic oxide film plate AP in which the entire plate is treated as defective due to a small defect may be repaired and made normal by the repair step. In this case, only a defective portion of the anodic oxide film plate AP is repaired, and an original normal region GF may remain used. Therefore, in the present disclosure, a problem wherein the anodic oxide film plate AP is treated as defective due to occurrence of a small defective portion and is discarded may be prevented.

In addition, in the present disclosure, through the repair step, the process of remanufacturing the anodic oxide film plate AP that has been treated as defective may be omitted. As a result, the anodic oxide film structure 1 of good quality may be efficiently manufactured, thereby improving production yield of the anodic oxide film structure 1.

As described above, the present disclosure has been described with reference to the exemplary embodiments. However, those skilled in the art will appreciate that various modifications, additions and substitutions are possible, without departing from the scope and spirit of the present disclosure as disclosed in the accompanying claims.

What is claimed is:

1. A manufacturing method of an anodic oxide film structure, wherein an anodic oxide film plate comprises an anodic oxide film and a plurality of through-holes through the anodic oxide film, the anodic oxide film being formed by anodizing a base material and removing a remaining portion of the base material after the anodizing has been performed, the manufacturing method comprising:
    testing whether a defective through-hole among the plurality of through-holes in the anodic oxide film plate exists; and
    repairing the defective through-hole existing in the anodic oxide film plate by dividing the anodic oxide film plate into a plurality of divided plates and replacing a defective divided plate including the defective through-hole with a normal divided plate without including the defective through-hole,
    wherein the defective divided plate is one of the plurality of divided plates, and the normal divided plate is distinct from the plurality of divided plates.

2. The manufacturing method of claim 1, further comprising:
    performing bonding with a bonding layer provided on at least one surface of the anodic oxide film plate.

* * * * *